United States Patent [19]
Madrid

[11] Patent Number: 5,318,334
[45] Date of Patent: Jun. 7, 1994

[54] CARRYABLE BAG BLANK FOR DISPOSING OF FECES, ORDURE AND THE LIKE

[76] Inventor: Richard F. Madrid, 109 Folland Dr., American Canyon, Calif. 94589

[21] Appl. No.: 994,508

[22] Filed: Dec. 21, 1992

[51] Int. Cl.$^5$ .............................................. A01K 29/00
[52] U.S. Cl. ......................................... 294/1.3; 294/2; 294/25
[58] Field of Search ................ 294/1.3, 1.4, 1.5, 2, 294/25; 15/257.1; 383/4, 104

[56] References Cited

U.S. PATENT DOCUMENTS

| | | | |
|---|---|---|---|
| 4,768,818 | 9/1988 | Kolic | 294/1.3 |
| 5,149,159 | 9/1992 | Bardes | 294/1.3 |

FOREIGN PATENT DOCUMENTS

| | | | |
|---|---|---|---|
| 3909418 | 11/1989 | Fed. Rep. of Germany | 294/1.3 |
| 2645188 | 10/1990 | France | 294/1.3 |
| 2649143 | 1/1991 | France | 294/1.3 |

Primary Examiner—Dean J. Kramer
Attorney, Agent, or Firm—Harold D. Messner

[57] ABSTRACT

This invention relates to a bag blank that is manipulatable to form a bag for capturing feces, ordure and the like and particularly to a bag blank that has a flat silhouette in profile and features a pair of hinge-like transverse foldlines normal to usual side foldlines. The side foldlines form termini for a pair of broad walls wherein such transverse foldlines are manipulable to permit an associated pair of skirt sections to undergo inverting movement relative to and interior of the pair of broad walls to create an inverted cavity of a transformed bag whose open end is horizontal adjacent to the transverse foldlines. In accordance with operational aspects, the user places his hand interior of the broad walls of the transformed bag wherein his palm fits adjacent to the apex section of the inverted cavity and his fingers and thumb reside in contact with continous terminus of the cavity. Manipulation of the user's fingers and thumb permits the cavity to grasp the feces, ordure and the like from a sidewalk, lawn, street or the like; lift such waste matter via tighten control of the cavity; and finally reorient the transformed bag in an inside-out maneuver about the inverted cavity wherein the feces, ordure or the like is completely encapsulated within the reconfigured bag. Thereafter, such bag and waste matter are properly disposed of in a receptacle.

20 Claims, 3 Drawing Sheets

U.S. Patent    June 7, 1994    Sheet 1 of 3    5,318,334

CARRYABLE BAG BLANK FOR DISPOSING OF FECES, ORDURE AND THE LIKE

SCOPE OF THE INVENTION

This invention relates to a pocket carryable bag blank that is hand manipulatable to form a bag for capturing and containing feces, ordure and the like and more particularly to a bag blank that has a flat silhouette in profile and features a pair of hinge-like transverse foldlines normal to usual side foldlines that form termini for a pair of broad walls of the bag blank wherein such transverse foldlines are manipulatable to permit an associated pair of bottom tapered skirt sections to undergo inverting movement relative to and interior of the pair of broad walls to create an inverted cavity of a transformed bag whose open end is horizontal adjacent to the transverse foldlines.

In accordance with operational aspects of the invention, the user places his hand interior of the broad walls of the transformed bag wherein his palm fits adjacent to the apex section of the inverted cavity and his digits including his fingers and thumb reside in contact with continuous terminus of the cavity. Manipulation of the user's fingers and thumb in the plane of the open end of the cavity permits the cavity to grasp the feces, ordure and the like from a sidewalk, lawn, street or the like; lift such waste matter via controlled tightening of the cavity; and finally reorient the transformed bag in an inside-out maneuver about the inverted cavity wherein the feces, ordure or the like is completely encapsulated within the reconfigured bag. Thereafter, such bag and waste matter are properly disposed of in a receptacle appropriate for such matter.

In accordance with apparatus aspects of the invention, the apex section of the inverted cavity can be repositioned wherein the open end of the cavity faces away from the earth's surface and the open end of the broad walls are located in contact with a horizontal support structure. In such position, the transverse and longitudinal dimensions between the broad walls are greater than similar dimensions for the upright cavity (due to the tapered construction of the latter). Hence, weight of a liquid such as water poured into the upright cavity can be contained without collapsing occuring.

In accordance with further apparatus aspects, the broad walls can be constructed of two plys of material originating from the transverse foldlines of the bag blank and extending toward the open end of the blank. Their purpose: to add further strength and stability when the upright cavity of the invention is used as a container for water.

BACKGROUND OF THE INVENTION

Pet owners are responsible for the feces, ordure and the like generated by their pets in public areas. To this end, owners walking their pets in public areas carry paper and/or plastic bags to aid them in picking up and disposing of such waste matter. However, these bags are usually too large and bulky to be conveniently carried, such as in a shirt pocket and often require use of a trowel, broom or the like or attached cardboard flaps to sweep the waste matter interior of the bag.

U.S. Pat. No. 5,020,1160 shows further means of avoiding the need for a trowel, broom or the like. It describes and claims a disposable glove having a tear line to facilitate its removal from the user's hand. Hence, any waste matter can be picked up and disposed of while the glove remains on the user's hand and then the glove itself can be discarded. However, the user's grip is not always stable and secure about the waste matter. Before disposing of the waste in a container, the waste matter can slip from the glove and be dropped to the ground, requiring the process to be repeated.

SUMMARY OF THE INVENTION

This invention relates to a pocket carryable bag blank that is hand manipulatable to form a bag for capturing and containing feces, ordure and the like and more particularly to a bag blank that has a flat silhouette in profile and features a pair of hinge-like transverse foldlines normal to usual side foldlines. The side foldlines form termini for a pair of broad walls of the bag blank wherein such transverse foldlines are manipulatable to permit an associated pair of bottom tapered skirt sections to undergo inverting movement relative to and interior of the pair of broad walls to create an inverted cavity of a transformed bag whose open end is horizontal adjacent to the transverse foldlines.

In accordance with operational aspects of the invention, the user places his hand interior of the broad walls of the transformed bag wherein his palm fits adjacent to the apex section of the inverted cavity and his digits including his fingers and thumb reside in contact with continuous terminus of the cavity. Manipulation of the user's fingers and thumb in the plane of the open end of the cavity permits the cavity to grasp the feces, ordure and the like from a sidewalk, lawn, street or the like; lift such waste matter via controlled tightening of the cavity; and finally reorient the transformed bag in an inside-out maneuver about the inverted cavity wherein the feces, ordure or the like is completely encapsulated within the reconfigured bag. Thereafter, such bag and waste matter are properly disposed of in a receptacle appropriate for such matter.

In accordance with apparatus aspects of the invention, the apex section of the inverted cavity can be repositioned wherein the open end of the cavity faces away from the earth's surface and the open end of the broad walls are located in contact with a horizontal support structure. In such position, the transverse and longitudinal dimensions between the broad walls are greater than similar dimensions for the upright cavity (due to the tapered construction of the latter). Hence, weight of a liquid such as water poured into the upright cavity can be contained without collapsing occurring.

In accordance with further apparatus aspects, the broad walls can be constructed of two plys of material originating from the transverse foldlines of the bag blank and extending toward the open end of the blank. Their purpose: to add further strength and stability when the upright cavity of the invention is used as a container for water.

BRIEF DESCRIPTION OF THE INVENTION

Figure 1:
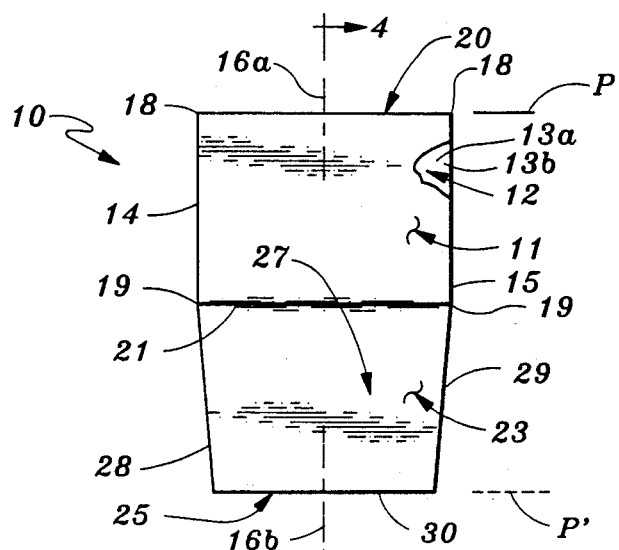
FIGS. 1, 2 and 3 are front elevational, side elevational and rear elevational views, respectively, of one embodiment of the invention showing the shape, size and functional characteristics of a bag blank having a series of foldlines therealong including a pair of side foldlines and a pair of transverse foldlines relative to a pair of first and second broad walls.
Figure 2:
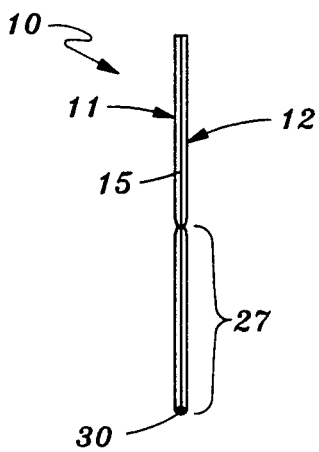
Figure 3:
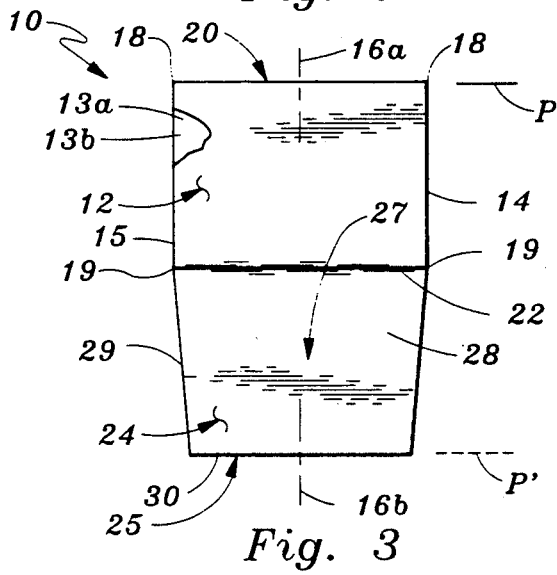

FIGS. 1, 2 and 3 are front elevational, side elevational and rear elevational views, respectively, of bag blank 10 of the invention. The bag blank 10 includes coextensive broad walls 11, 12 having a flat silhouette in profile wherein inner surfaces 13a, 13b are in interior surface contact, see FIGS. 1 and 3.

In the transverse direction, the broad walls 11, 12 are defined by a pair of side foldlines 14, 15. The side foldlines 14, 15 are parallel to each other and to a longitudinal axis of symmetry 16a. The lengths of the side foldlines 14, 15 are determined by upper and lower end edges 18, 19, respectively, thereof. That is to say, in the longitudinal direction, the upper end edges 18 of the side foldlines 14, 15 are coextensive of open end 20 defining a first transverse plane P. The lower end edges 19 intersect and are coincident with transverse foldlines 21, 22.

Transverse foldlines 21, 22 provide for hinge action as explained in more detail below in association with a pair of skirt segments 23, 24 that extend from and are integrally formed with respect to the transverse foldlines 21, 22 as well as extending toward and being integrally formed with respect to closed end 25 of the blank 10. As shown in FIG. 2 the pair of skirt segments 23, 24 are coincident with the lower section of the blank 10 generally indicated at 27. While transverse foldlines 21, 22 form the upper termini of the skirt segments 23, 24, as mentioned above, note that they are also integrally formed with respect to the broad walls 11, 12. Such formation occurs specifically at the intersection of tapered side foldlines 28, 29 of the skirt segments 23, 24 with the parallel foldlines 14, 15 of the broad walls 11, 12 wherein end edges 19 are common to each. The transverse foldlines 21, 22 are also seen to be parallel with transverse planes P and P', see FIGS. 1 and 3.

Further characteristics of the skirt segments 23, 24 are as follows: the degree of taper of the side foldlines 28, 29 vary as a function of thickness of the skirt segments 23, 24 as is the range of 1 to 3 degrees for thin, one-ply plastic materials and greater than 5 degrees for thicker types of materials; and the skirt segments 23, 24 define a longitudinal axis of symmetry 16b coincident with the longitudinal axis 16a.

Figure 4:
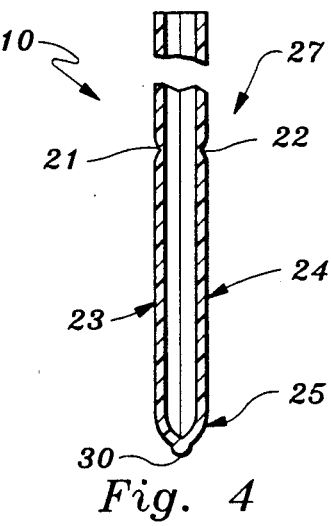
FIG. 4 is a section, enlarged, taken along line 4—4 of FIG. 1.

Note in FIG. 4 note that the common closed end 25 defined by a common bottom foldline 30 is parallel with the transverse foldlines 21, 22. In FIG. 3, note that a second transverse plane P' parallel to the first transverse plane P also marks the position of the bottom foldline 30.

Figure 5:
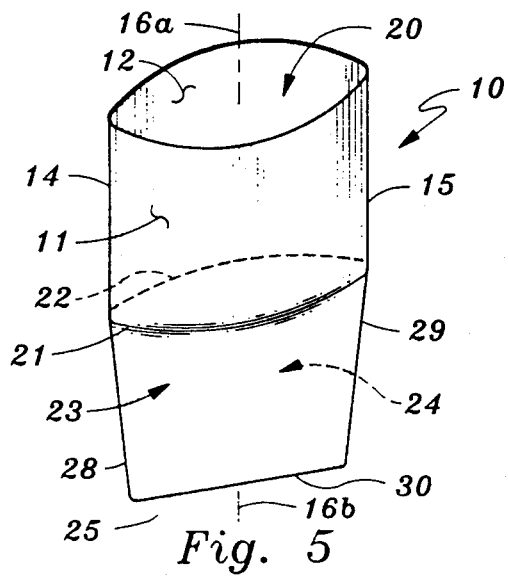
FIG. 5 is a perspective view of the bag blank of FIGS. 1-4 in which the open end of the blank is oriented into an oval shape but a pair of tapered skirt segments formed at the closed end of the blank are in broad surface contact.
Figure 6:
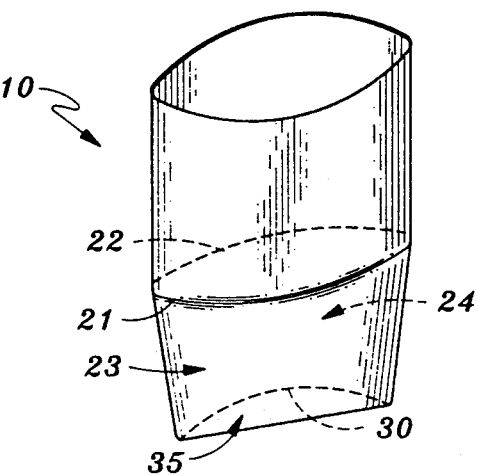
FIG. 6 is another perspective view of the bag blank of FIGS. 1-4 in which inverting movement of the bottom foldline of the pair of skirt segments at the lower region of the blank toward the transverse foldlines has just begun wherein an inverted cavity of limited size and shape is formed interior of the broad walls.
Figure 7:
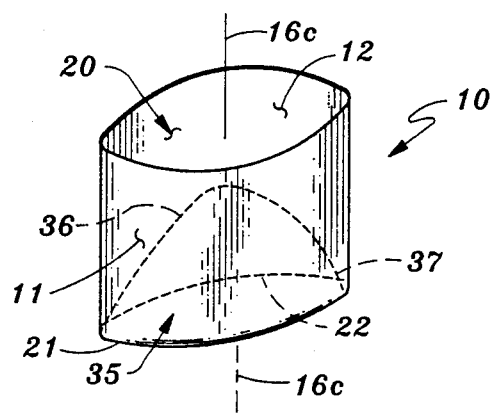
FIG. 7 is another perspective view of the bag blank of FIGS. 1-4 in which inverting movement of the tapered skirt segments has been completed wherein the size of cavity has reached its maximum and a reconfigured bag is formed.

FIGS. 5, 6 and 7 illustrate the manner in which the bag blank 10 of FIGS. 1-4 is transformed into a transformed bag 10' having the capability of being manipulable to permit a user to grasp and stow waste matter.

Note in FIG. 5 that open end 20 of the blank 10 has been reoriented from a flat silhouette depicted in FIGS. 1-4 into an oval or egg shaped design. This shape is brought about by inward movement of the side foldlines 14, 15 of the broad walls 11, 12 and/or by similar movement of the tapered side foldlines 28, 29 of the skirt segments 23, 24. Such movement is hand generated and causes the broad walls 11, 12 and skirt segment 23, 24 to pivot about pivot axes (not shown) coincident with the foldlines 14, 15 and 28, 29 with respect to and away from the longitudinal axes 16a, 16b. The transverse foldlines 21, 22 also become oval because of such foldline movement. The closed end 25 of the blank 10 including common bottom foldine 30 remains essentially stationary.

FIG. 6 illustrates the initial manipulation of the skirt segments 23, 24 with respect to pivoting action about the transverse foldlines 21, 22. As shown, common bottom foldline 30 has undergone inverting pivoting travel about transverse axes common to the transverse foldlines 21, 22. As a result, an inverting cavity 35 derived from portions of the skirt segments 23, 24 is formed. Note that the cavity 35 of FIG. 6 is common to a portion of the skirt segments 23, 24 that has undergone inverting travel into and with respect to the remainder of such skirt segments 23, 24. The location of the bottom foldline 30 is also seen to be completely within the confines of the skirt segments 23, 24.

FIG. 7 shows the completion of the inverting travel of the skirt segments 23, 24 about the transverse foldlines 21, 22 wherein a transformed bag 10' as depicted, is formed. As a result, the concical cavity 35 thus formed is of maximum size and shape and completely containing within the broad walls 11, 12 of the transformed bag 10'. That is, apex section 36 of the cavity 35 is extends vertically to a position adjacent to open end 20 of the transformed bag 10'. Also circumferentially extending terminus segment 37 of the cavity 35 is positioned coincident with the open end 38 of the cavity 35 coplanar with the transverse foldlines 21, 22. Both of the above-mentioned structures are also symmetrical about longitudinal axis of symmetry 16c and are preferrably contained completely within the broad walls 11, 12. Hence, travel of the bottom foldline 30 of FIG. 6 has been coextensive with the entire longitudinal extent of the skirt segments 23, 24 although note that less travel can occur, if desired. Such limited travel should be over a majority of the longitudinal extent of skirt segments 23, 24, however.

Figure 8:
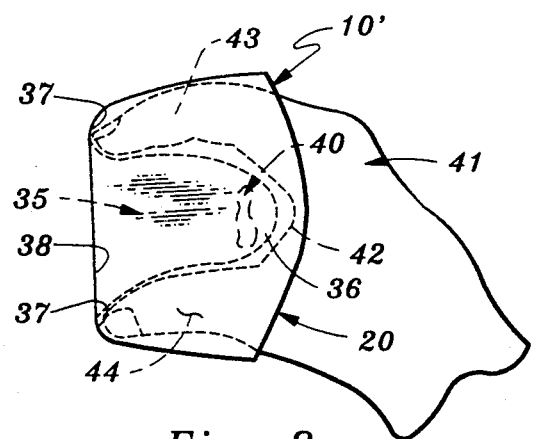
FIG. 8 is a side view of the reconfigured bag of FIG. 7 in which a user's hand has been inserted about the inverted cavity wherein the apex section of the cavity fits adjacent to the palm of the user's hand and the terminus of the cavity fits in manipulating contact with the fingers and thumb of the user.
Figure 9:
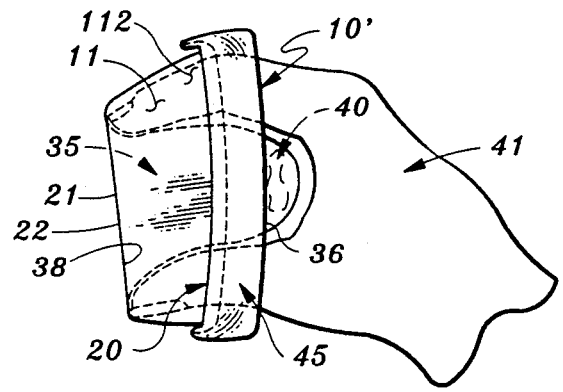
FIG. 9 is another side view of the reconfigured bag of FIG. 7 in inside-out movement of the broad walls has begun wherein the top edges of the original blank undergo movement toward the open end of the inverted cavity.

FIGS. 8 and 9 illustrate how the transformed bag 10' is used to grasp and encapsulate waste matter 40 using human hand 41 manipulated into a praying mantis-like position, as depicted.

At the outset, note that the transverse and longitudinal dimensions of the open end 20 of the transformed bag 10' are sized to accommodate the human hand 41. Thus, the user can easily pass his hand 41 interior of the broad walls 11, 12 (see FIG. 7) of the transformed bag 10' to a praying mantis-like position as shown in FIGS. 8 and 9. That is, palm 42 fits adjacent to the apex section 36 of the inverted cavity 35, and the digits, viz., his fingers 43 and thumb 44, reside in contact with the circumferential extending, terminus segment 37 of the cavity 35. In order that the waste matter 40 be contained within the cavity 35, the user manipulates his fingers 43 and thumb 44 in the plane of the open end 38 of the cavity 35. Such action allows the waste matter to be first grasped from a sidewalk, lawn, street or the like and then controlled in its travel to its final location which is depicted to be adjacent to the apex section 36 of the cavity 35. Note that such matter 40 is also seen to be adjacent to the open end 20 of the broad walls 11, 12 (see FIG. 9) of the transformed bag 10'.

FIG. 9 illustrates how inside-out maneuvering of the transformed bag 10' of FIG. 8 is carried out to extract the user's hand 41 from interior of the broad walls 11, 12 in a manner that results in the provision of a reconfigured bag that is sized and shaped like the original bag blank 10 of FIG. 5 except its inner and outer surfaces thereof are reversed. Furthermore, after inside-out maneuvering has been completed, the apex section 36 of the cavity 35 also preferably supports the waste matter 40 near to the closed end of the reconfigured bag.

As shown, the hand 41 is extracted by causing the original open end 20 of the transformed bag 10' to undergo movement toward the open end 38 of the cavity 35 (which, of course, coincident with the transverse foldlines 21, 22). In this regard, note that portions of the broad walls 11, 12 have overlapped each other to form a multi-ply segment 45. Continued travel completes the inside-out maneuvering of the broad walls 11, 12 about the transverse foldines 21, 22 whereby the positions of its inner and outer surfaces are reversed. In the reconfigured bag of the invention, the apex section 36 of the cavity 35 forms the bottom wall. To aid in the transformation, the user can orient the open end 38 of the cavity 35 skyward so that gravity aids in securing the waste matter 40 adjacent the apex section 36. Thereafter, user can grasp the open end 20 of the inside-out reconfigured bag for easy transfer to a waste container appropriate for the disposal of the waste matter 40 therein. Note that inside-out reconfigured bag has the appearance of the blank of FIG. 5 except for the reversal of the inner and outer surfaces of the broad walls 11, 12 and skirt segments 23, 24 in the manner previously described.

Figure 10:
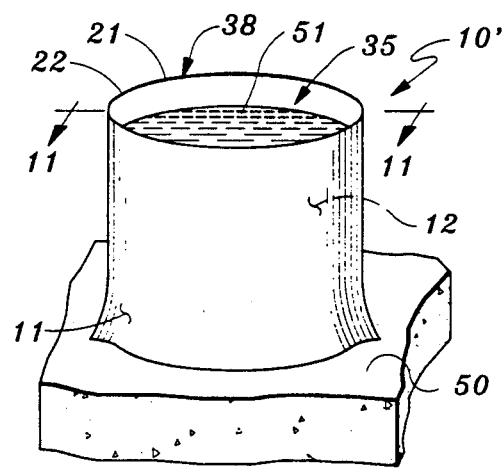
FIG. 10 is a perspective view of the reconfigured bag of FIG. 7 in which the open end of the cavity is positioned facing away from the earth's surface; the apex section is in contact with a horizontal support structure; and a liquid such as water has been poured into the cavity.
Figure 11:
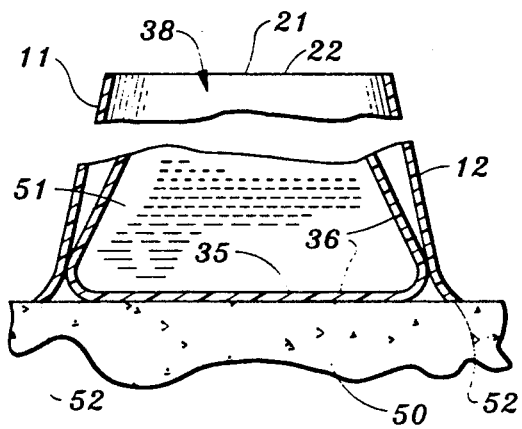
FIG. 11 is a section, enlarged, taken along line 10—10 of FIG. 10.

FIGS. 10 and 11 depict an additional capability of the transformed bag 10' of FIG. 7. As shown, the cavity 35 has been reoriented such that its open end 38 faces away from a horizontal support structure 50 and a liquid such as water 51 has been poured into the cavity 35. Such a structure remains stable even under the weight of the water 51 because of the stabilizing effect of the transverse foldlines 21, 22 coincident with the open end 38 of the cavity 35.

The weight of the water 51 also as an additional effect. As shown in FIG. 11, the apex section 36 of cavity 35 has been changed by the weight of the water 51 so that a portion of such section 36 now conforms to the shape of the broad walls 11, 12 while a greater portion conforms with the flatness of the horizontal structure 50. Also note that the open end 20 of the broad walls 11, 12 is now located in contact with the structure 50 in coplanar alignment with flattened portion of the apex section 36. But recall that the transverse and longitudinal dimensions between the broad walls 11, 12 are greater than similar dimensions for the upright cavity 35 (due to the tapered construction of the latter). Hence, ends 52 of the broad walls 11, 12 roll outward as water 51 is added to the cavity 35 to further resist the weight of the latter.

SECOND EMBODIMENT

Figure 12:
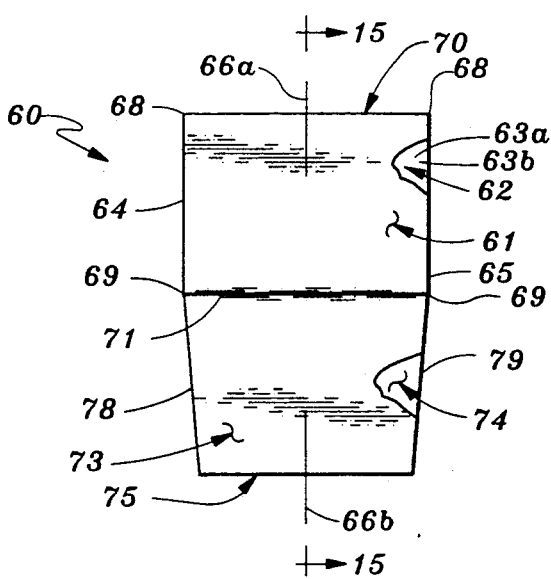
FIGS. 12, 13 and 14 are front elevational, side elevational and rear elevational views, respectively, of a second embodiment of the invention showing the shape, size and functional characteristics of a bag blank modified to include broad walls of two-ply construction.
Figure 13:
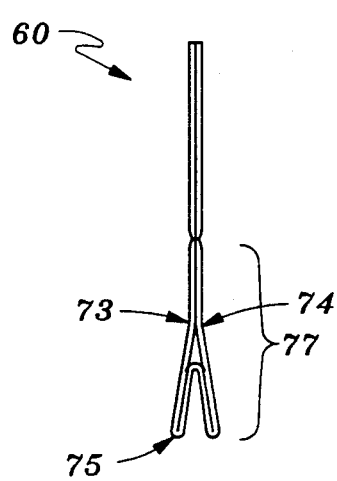
Figure 14:
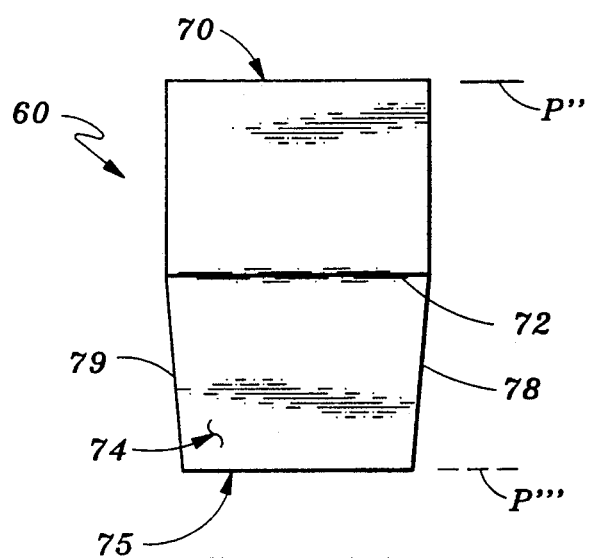

FIGS. 12, 13 and 14 are front elevational, side elevational and rear elevational views, respectively, of another bag blank 60 in accordance with the teachings of the invention. The bag blank 60 includes coextensive broad walls 61, 62 having a flat silhouette in profile wherein inner surfaces 63a, 63b are in interior surface contact, see FIGS. 12 and 14.

In the transverse direction, the broad walls 61, 62 are defined by a pair of side foldlines 64, 65. The side foldlines 64, 65 are parallel to each other and to a longitudinal axis of symmetry 66a. The lengths of the side foldlines 64, 65 are of the same magnitude determined by the distance between upper and lower end edges 68, 69, respectively.

That is to say, in the longitudinal direction, the upper end edges 68 of the side foldlines 64, 65 are coextensive of open end 70 defining a first transverse plane P'', see FIG. 14. The lower ends 69 intersect and are coincident with transverse foldlines 71, 72.

Transverse foldlines 71, 72 provide for hinge action as explained in more detail below in association with a pair of skirt segments 73, 74 that extend from and are integrally formed with respect to the transverse foldlines 71, 72 as well as extending toward and being integrally formed with respect to closed end 75 of the blank 60, see FIG. 14. As shown in FIG. 13 the pair of skirt segments 73, 74 are coincident with the lower section of the blank 60 generally indicated at 77.

Returning to FIGS. 12 and 14, while transverse foldlines 71, 72 form the upper termini of the skirt segments 73, 74, as mentioned above, note that they are also integrally formed with respect to the broad walls 61, 62. Such formation occurs at the intersection of tapered side foldlines 78, 79 of the skirt segments 73, 47, with the parallel foldlines 64, 65 of the broad walls 61, 62 wherein end edges 69 are common to each. The transverse foldlines 71, 72 are also seen to be parallel with transverse planes P" and P'", see FIG. 14.

Further characteristics of the skirt segments 73, 74 are as follows: the degree of taper of the side foldlines 78, 79 vary as a function of thickness of the skirt segments 73, 74 as is the range of 1 to 3 degrees for thin, one-ply plastic materials and greater than 5 degrees for thicker types of materials.

Figure 15:
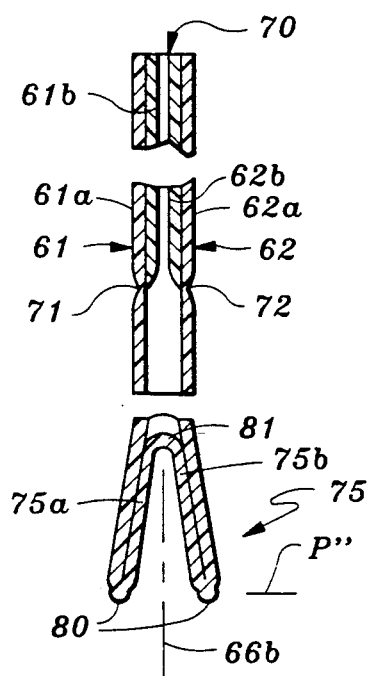
FIG. 15 is a section, enlarged, taken along line 15—15 of FIG. 12.

Note in FIG. 15 that the closed end 75 is Vee-shaped and includes inverted first and second legs 75a, 75b that fold vertically from foldlines 80 to intersect at a common included foldline 81. The included foldline 81 is seen to be positioned between the foldlines 80 and the transverse foldlines 71, 72.

Vertically displaced above the transverse foldlines 71, 72, note that the broad walls 61, 62 include the following: broad wall 61 includes an outer element 61a and an inner element 61b and broad wall 62 includes an outer element 62a and an inner element 62b. Note that the inner elements 61b, 62b of the walls 61, 62 are closely adjacent to each over their entire lengths, viz., from position of origination at transverse foldlines 71, 72 to their termination at the open end 70 of the blank 60.

Returning to FIG. 15, note that transverse plane P'" also marks the position of the foldlines 80 forming the termini of the blank 60. Such plane P'" is parallel to transverse plane P" coincident with the open end 70, see FIG. 14.

Figure 16:
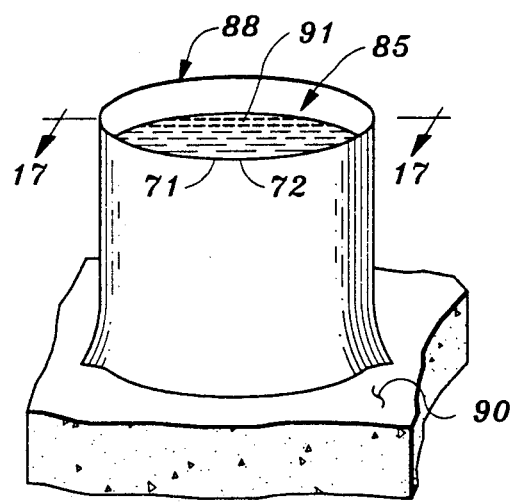
FIG. 16 is a perspective view of the invention of FIGS. 12-15 in which bag blank has been transformed into a reconfigured bag having a cavity that is seen to be supported on a horizontal support structure and in which a liquid such as water has been poured into the cavity.
Figure 17:
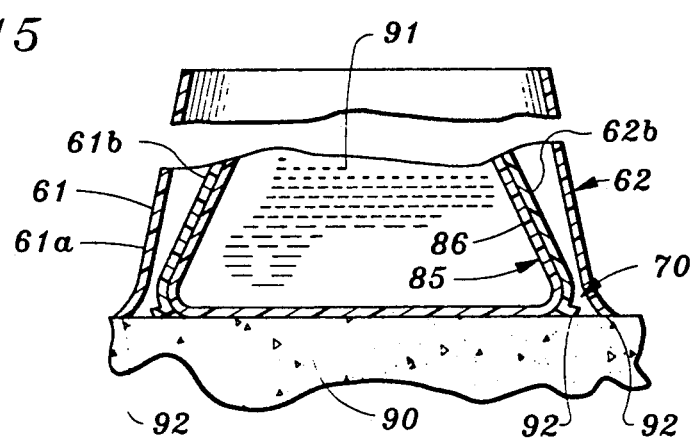
FIG. 17 is a section, enlarged, taken along line 17—17 of FIG. 16.

FIGS. 16 and 17 depict an additional capability of the blank 60 of FIGS. 12–15. In FIG. 16 assume that the blank 60 has been transformed to form a reconfigured bag in the manner of the transformed bag 10' of FIG. 7. As shown in FIG. 16, an inverted cavity 85 thus formed has its open end 88 facing away from a horizontal support structure 90 and supports a liquid such as water 91 which has been poured into the cavity 85. Such a structure remains stable even under the weight of the water 91 because of the following: (i) There is a stabilizing effect provided by the transverse foldlines 71, 72 coincident with the open end 88 of the cavity 85, (ii) There is additional support provided by the wall elements 61a, 61b, 62a, 62b comprising the broad walls 61, 62, see FIG. 17 and (ii) There is additional area provided by the skirt segments 73, 74 of the blank 60 of FIGS. 12-14 due to the fact that the closed end 75 is Vee-shaped to increase the ability of the cavity 85 to conform to its position relative to the support structure 90.

The weight of the water 51 has these effects. As shown in FIG. 17, apex section 86 of cavity 85 has been changed by the weight of the water 91 so that a portion of such section 86 now conforms to the shape of the wall elements 61b, 62b of the broad walls 61, 62, respectively, while a greater portion conforms with the flatness of the horizontal structure 90. Also note that the open end 70 of the wall elements 61a, 61b, 62a, 62b is now located in contact with the structure 90 in coplanar alignment with flattened portion of the apex section 86. But recall that the transverse and longitudinal dimensions between the broad walls 61, 62 are greater than similar dimensions for the upright cavity 85 (due to the tapered construction of the latter). Hence, ends 92 of the broad walls 61, 62 roll outward as water 91 is added to the cavity 85 to further resist the weight of the latter.

The above description contains several specific embodiments of the invention. They are not intended to be construed as limitations on the scope of the invention but merely examples of preferred embodiments. Persons skilled in the art can envision other obvious possible variations with the scope of the description. For example, the transformed bag 10' of FIG. 7 could be used in atomic energy plants to grasp and encapsulate radioactive waste matter. In such application, the waste matter 40 which could be radioactive tools, fixures, fasteners, bolts, gloves, etc. would be collected and stowed in the manner set forth in detail in FIGS. 8 and 9. In addition, the transformed bag 10' of FIG. 7 could also be modified to use as a receptacle for shells for nuts, sunflower and/or punkin seeds and the like wherein the cavity 35 of transformed bag 10' is used to receive a separate container of the nuts, sunflower and/or punkin seeds. Such container would be about twice the height of the bag 10'. Then, after such container is opened, the bag 10' undergoes inside-out travel to provide reconfigured bag having pods at the sides of the container. A seperate clasp can be provided the reconfigured bag to stow the shells until proper disposal can occur. Still further, the bag blank 10 of FIGS. 1–4 and bag blank 60 of FIGS. 12–15 could be used to transport pet accessories prior to their reformation for use to capture and dispose of waste materials in the manner set forth above.

Hence the scope of the invention is to be determined by the appended claims and their legal equivalents.

What is claimed is:

1. A carryable bag blank which is hand manipulatable to form a transformed bag having an interior cavity (i) for capture and stowage of waste material and (ii) for encapsulating liquid for providing a drink to a pet, comprising first and second broad walls in flat profile coextensive of each other, defined by common first and second side foldlines parallel to each other, a first longitudinal axis of symmetry parallel to said first and second side foldlines, and end edges forming an open end defining a first transverse plane normal to said first longitudinal axis, first and second skirt segments also in flat profile coextensive of each other, defined by common first and second side foldlines having first ends common to said first and second side foldlines of said first and second broad walls, a second longitudinal axis of symmetry coincident with said first longitudinal axis, and a closed end including bottom foldline means intersecting said side foldlines, said bottom foldline means defining a second transverse plane normal to both said first and second longitudinal axes, first and second transverse foldlines intersecting said side foldlines of said broad walls and said skirt segments at said first common ends of said common side foldlines of said skirt segments, said transverse foldlines being integrally formed with respect to both said first and second broad walls and said first and second skirt segments, parallel to said first and second transverse planes and forming hinges for aiding in pivotable rotation of said skirt segments thereabout whereby said bottom foldline means defining said closed end travels between said skirt segments so as to create a transformed bag having an interior cavity derived therefrom of (i) capture and stowage for waste material and (ii) encapsulating liquid for providing a drink to a pet.

2. The bag blank of claim 1 in which said first and second broad walls of said transformed bag are pivotable about longitudinal pivot axes coincident with said side foldlines thereof to define at least an oval transverse cross section and in which said skirt segments are pivotable about transverse pivot axes coincident with said transverse foldlines but wherein said common side foldlines are inwardly tapered relative to said longitudinal axis to aid in creation of said interior cavity from said skirt segments alone, said longitudinal and transverse pivot axes being normal to each other.

3. The bag blank of claim 2 in which said interior cavity of said transformed bag is of a truncated conical shape and includes a terminus segment integrally connected to said broad walls and defining an open end coplanar with said transverse foldlines of said skirt segments, a longitudinal axis of symmetry and an apex section bisected by said longitudinal axis of symmetry of said cavity.

4. The bag blank of claim 3 in which said end edges of said broad walls of said transformed bag are supportable on a substantially horizontal support structure wherein said open end of said cavity faces away from said support structure to permit liquid to enter therethrough and stowed within said apex section of said cavity.

5. The bag blank of claim 4 in which a portion of said apex section and said terminus segment of said cavity conform to said support structure and a portion is in supporting contact with said broad walls to thereby provide stable stowage of said liquid.

6. The bag blank of claim 5 in which said broad walls supporting said cavity are single ply material and wherein said bottom foldline means is a single foldline coplanar with said second transverse plane.

7. The bag blank of claim 5 in which said broad walls supporting said cavity are double ply in which one ply emanates from said transverse foldlines of said skirt segments and wherein said bottom foldline means is a pair of foldlines coplanar with said second transverse plane, said pair of foldlines integrally formed with respect to said closed end, said closed end being of inverted V-shaped cross section.

8. The bag blank of claim 3 in which said terminus segment of said cavity integrally connected to said broad walls is sized to fit a human hand including digits and a palm wherein said digits are placed in contact with said terminus segment and then are manipulated so as to permit said open end of said cavity in conjunction with said terminus segment to grasp and stow said waste material interior of said cavity.

9. The bag blank of claim 8 in which said waste material is radioactive.

10. The bag blank of claim 8 in which said human hand is extracted from interior of said broad walls of said transformed bag by causing inside-out travel of said broad walls with respect to said apex section of said cavity wherein said open end of said broad walls overlaps portions of said broad walls in sequence to provide a reconfigured bag that is sized and shaped like said original bag blank except inner and outer surfaces thereof are reversed.

11. In a carryable bag blank which is hand manipulatable to form a transformed bag having an interior cavity for (i) capture and stowage of waste material and (ii) encapsulating liquid for providing a drink to a pet, the bag blank comprising first and second broad walls in flat profile coextensive of each other, defined by common first and second side foldlines parallel to each other, a first longitudinal axis of symmetry parallel to said first and second side foldlines, and end edges forming an open end defining a first transverse plane normal to said first longitudinal axis, first and second skirt segments also in flat profile coextensive of each other, defined by common first and second side foldlines having first ends common to said first and second side foldlines of said first and second broad walls, a second longitudinal axis of symmetry coincident with said first longitudinal axis, and a closed end including bottom foldline means intersecting said common side foldlines of said skirt segments, said bottom foldline means defining a second transverse plane normal to both said first and second longitudinal axes, first and second transverse foldlines intersecting said side foldlines of said broad walls and said skirt segments at said first common ends of said side foldlines, said transverse foldlines being integrally formed with respect to both said first and second broad walls and said first and second skirt segments, parallel to said first and second transverse planes and forming hinges for aiding in pivotable rotation of said skirt segments thereabout whereby said bottom foldline means associated with said closed end travels between said skirt segments so as to create a transformed bag having an interior cavity derived therefrom of (i) capture and stowage for waste material and (ii) encapsulating liquid for providing a drink to a pet; whereby a means is capable of providing said pivotable rotation of said skirt segments about said first and second transverse foldlines to create said transformed bag, said means sized to pass through said open end of said broad walls and fit about said interior cavity of said transformed bag 12. The bag blank of claim 11 in which said means also provides for rotation of said first and second broad walls of said transformed bag about longitudinal pivot axes coincident with said side foldlines thereof to define at least an oval transverse cross section and in which said skirt segments are pivotable about transverse pivot axes coincident with said transverse foldlines but wherein said common side foldlines are inwardly tapered relative to said longitudinal axis to aid in the creation of said interior cavity from said skirt segments alone, said longitudinal and transverse pivot axes being normal to each other.

13. The bag blank of claim 12 in which said interior cavity of said transformed bag is of a truncated conical shape and includes a terminus segment integrally connected to said broad walls and defining an open end coplanar with said transverse foldlines of said skirt segments, a longitudinal axis of symmetry and an apex section bisected by said longitudinal axis of symmetry of said cavity.

14. The bag blank of claim 13 in which said end edges of said broad walls of said transformed bag are supportable on a substantially horizontal support structure wherein said open end of said cavity faces away from said support structure to permit liquid to enter therethrough and stowed within said apex section of said cavity.

15. The combination of claim 14 in which said a portion of said apex section and said terminus segment of said cavity conform to said support structure and a portion is in supporting contact with said broad walls to thereby provide stable stowage of said liquid.

16. The bag blank of claim 15 in which said broad walls supporting said cavity are single ply material and wherein said bottom foldline means is a single foldline coplanar with said second transverse plane.

17. The bag blank of claim 15 in which said broad walls supporting said cavity are double ply in which one ply emanates from each of said transverse foldlines of said skirt segments and wherein said bottom foldline means is a pair of foldlines coplanar with said second transverse plane, said pair of foldlines integrally formed with respect to said closed end, said closed end being of inverted V-shaped cross section.

18. The bag blank of claim 13 in which said terminus segment of said cavity integrally connected to said broad walls fits said means to permit said open end of said cavity in conjunction with said terminus segment to grasp and stow said waste material interior of said cavity.

19. The bag blank of claim 18 in which said waste material is radioactive.

20. The bag blank of claim 18 in which said means is extracted from interior of said broad walls of said transformed bag by causing inside-out travel of said broad walls with respect to said apex section of said cavity wherein said open end of said broad walls overlaps portions of said broad walls in sequence to provide a reconfigured bag that is sized and shaped like said original bag blank except inner and outer surfaces thereof are reversed.

* * * * *